(12) United States Patent
Jakob

(10) Patent No.: US 6,370,739 B1
(45) Date of Patent: Apr. 16, 2002

(54) SCREWED CONVEYOR BELT FASTENER

(75) Inventor: Horst Jakob, Deaux (FR)

(73) Assignee: Aser, Saint-Chamond (FR)

( * ) Notice: Subject to any disclaimer, the term of this patent is extended or adjusted under 35 U.S.C. 154(b) by 0 days.

(21) Appl. No.: 09/719,393

(22) PCT Filed: Apr. 11, 2000

(86) PCT No.: PCT/FR00/00927

§ 371 Date: Mar. 14, 2001

§ 102(e) Date: Mar. 14, 2001

(87) PCT Pub. No.: WO00/61966

PCT Pub. Date: Oct. 19, 2000

(30) Foreign Application Priority Data

Apr. 12, 1999 (FR) .............................. 99 04569

(51) Int. Cl.$^7$ .............................. A44B 21/00; F16G 3/08
(52) U.S. Cl. ................... 24/31 R; 24/31 F; 24/31 B; 24/33 B; 24/37
(58) Field of Search ................... 24/31 R, 33 B, 24/33 M, 31 F, 37, 33 F, 31 B, 31 L, 33 P; 474/257, 256, 253, 255; 198/847

(56) References Cited

U.S. PATENT DOCUMENTS

| 1,382,799 A | * | 6/1921 | Purple | 24/37 |
| 1,659,001 A | * | 2/1928 | Purple | 24/37 |
| 2,477,855 A | * | 8/1949 | Beach | 24/31 B |
| 3,141,346 A | * | 7/1964 | Dean | 24/37 |
| 4,558,492 A | | 12/1985 | Hite et al. | |

FOREIGN PATENT DOCUMENTS

GB 464 068 4/1937

* cited by examiner

*Primary Examiner*—Victor N. Sakran
(74) *Attorney, Agent, or Firm*—Browdy and Neimark, P.L.L.C.

(57) ABSTRACT

The fastener (1, 2, 3) comprises for the screwing of screws, dimplings (5, 5') set in a fixation plate (2) of the fastener. The dimplings (5, 5') are attached to the fixation plate (2) in which they are made only on one part of their circumference, two reserved zones (81, 82 or 81', 82') for each dimpling not being stamped at the base of the dimplings and comprising shearings in the sheet metal of the fixation plate (2), allowing a certain tilting of the dimpling (5 or 5') during operation of the conveyor belt.

3 Claims, 2 Drawing Sheets

SCREWED CONVEYOR BELT FASTENER

The present application is the national stage under 35 U.S.C. 371 of PCT/FR00/00927, filed Apr. 11, 2000.

Fasteners are known for joining conveyor belts, belts and similar products which comprise hinge elements and are likely to be fixed astride an end of a conveyor belt, the hinge elements being able to be placed between similar hinge elements, belonging to a similar fastener fixed at the other end of the conveyor belt, the two fasteners being linked by a linkage and articulation pin passing alternately through a hinge element of one of the fasteners and then through a hinge element of the other of the fasteners.

This general type of fastener can be linked to the end of a conveyor belt by rivets, nut and screw systems, flange-back nails, twin-point staples. These rivets, screws, nails or staples are passed through holes already pierced in the upper half of the fastener, crossing through the conveyor belt, and then through holes already pierced in the lower half of the fastener, and are locked from the other side by forming a second rivet head, by tightening a screw, or by bending the ends of the nails or the twin point staples.

The major problem faced by these very rigid fixation systems is the rupture of the rivets, screws or pins of nails or staples, caused by the strains undergone by these rigid assemblies when the conveyor belt is operated under severe conditions. Even the twin point staples can break, in particular because of the strains imposed when the conveyor belt passes over the forward or backward rollers. Such breaks cause damage and involve repeated stoppages for repairs.

The aim of the present invention is to develop a new fastener for conveyor belts in which the means of fixation is constituted of screws, but in which the ensemble of the means used allows a certain flexibility of screw linkage of the two halves, upper and lower, of the fastener, this flexibility being indispensable to ensure the lifetime of the linkage and/or fastener, because of the difference between the path of the lower face and the upper face of the conveyor belt, at the moment of passage over the forward and backward rollers.

This problem is solved by using a joining fastener for the conveyor belt, comprising two fixation plates linked by U-shaped hinge elements presenting, in one of the fixation plates, holes allowing the passage of a screw and holding its head and in the other fixation plate dimplings which are oriented towards the first fixation plate, the screws passed through the holes of the first fixation plate being able to be screwed in the dimplings which are arranged in line with the corresponding holes of the first fixation plate when the fastener is tightened on a conveyor belt end, characterised in that the dimplings, at their base, present steps extending over a part of their external circumference, but separated by two circular sectors without diametrically opposed steps, generally oriented in the longitudinal direction of the conveyor belt on which the fastener according to the invention is set (or will be set), the material of the fixation plate being sheared at the position of these non-deformed circular sectors so as to allow the formation of the step partially surrounding the dimpling by stamping the base plate.

In an embodiment of the invention, the dimpling is threaded internally for the pitch of the screws used to fix the fastener on the end of the conveyor belt. However, such threading is not absolutely necessary since when the dimpling has a smooth surface, the use of self-threading screws gives an excellent grip, especially since in the case of normal use, these screws are never unscrewed and re-screwed.

Advantageously the holes in one of the fixation plates destined for the passage of screws are given an opening in the form of a cup allowing the screw heads to lodge there so that they do not pass through the external face of the fastener.

As the steps made by stamping the dimplings form a cup on the external side of the plate provided with dimplings, even if the screws pass a little further than the chimney of the dimpling, the length of the screws can be such that the end of the screws does not go beyond the plane of the external face of the fixation plate provided with dimplings, that is to say that the end of the screws is in the space comprised between the base of the dimpling chimney and the plane of the external face of the fixation plate provided with dimplings.

Thus, the joints do not have any asperities which, otherwise, could be constituted of screw heads or their ends.

One embodiment will now be described as an illustrative example in relation to the drawing in which.

Figure 1:
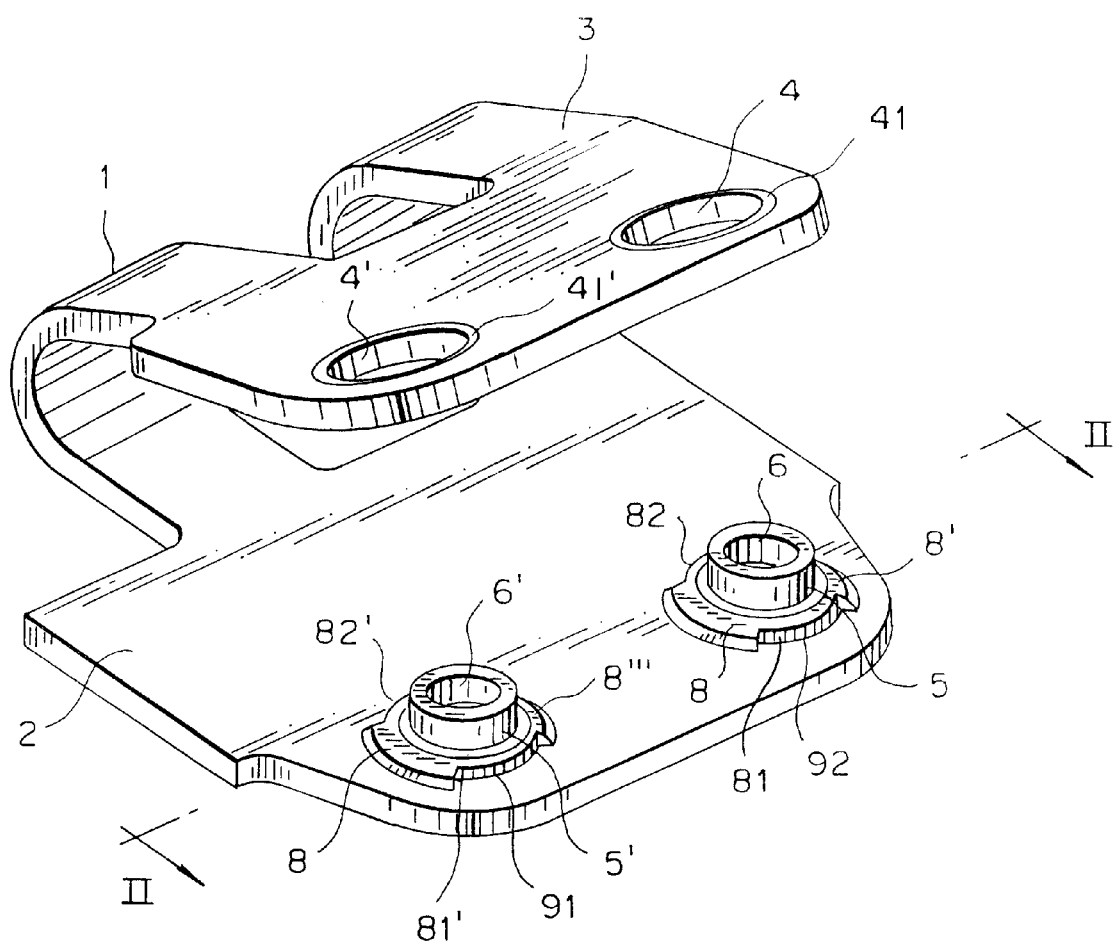
FIG. 1 represents a fastener according to the invention seen in perspective.

FIG. 1 represents in perspective such a fastener, presented individually, but being able to be manufactured in strips of fasteners of the same type, linked by short metal bridges. Note the elements of the hinge 1, U-shaped, a lower half 2 and an upper half 3. The upper half comprises two holes 4, 4' set on the side opposite to that of the hinge elements. These holes comprise cups 41, 41' to serve for resting the heads of the screws. The lower half comprises two dimplings 5, 5' made in the metal and which show a central hole forming a cylindrical chimney 6, 6'. These dimplings are oriented towards the other half of the fastener, thus, once the fastener is mounted, towards the lower face of the conveyor belt.

The fastener of FIG. 1 is shown as it is delivered, that is to say before mounting on the end of a conveyor belt. It is to be noted that it is open, the two halves, upper and lower, only being clamped one on the other at the moment of mounting, when gripping the end of the conveyor belt. Note that from the internal side of the lower half, the dimplings 5, 5' show a step 8, 8', 8" 8'" which does not complete the circumference, this step being interrupted in 81, 82 and 81", 82'. The explanations for this will be given below.

Figure 2:
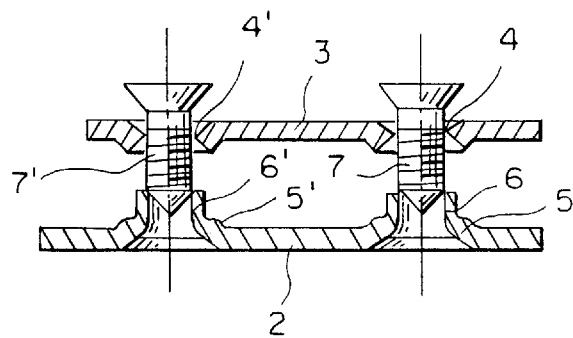
FIG. 2 is a cross-section along the line II–II of FIG. 1, of the fastener according to the invention in FIG. 1, the fastener being clamped back and the screws beginning to be tightened.

FIG. 2 shows a cross-section along the line II—II of FIG. 1 with one fastener folded, the two upper and lower halves being at least approximately parallel and the holes 4, 4' aligned with the chimneys 6, 6' of the dimplings 5, 5'. Note the screws 7, 7' in the holes 4 and 4'. The chimneys 6, 6' can carry an internal thread whose pitch and other characteristics correspond to those of the screws. But, in practice, screws 7, 7' are preferred, that is auto-threading screws, and then the chimneys are smooth inside.

It is understood that the end of the conveyor belt being introduced into the space between the two halves of the fastener, upper and lower, it is possible to pass the screws in the holes 4, 4', and then to cross them through the thickness of the conveyor belt, the screws themselves making their hole in the conveyor belt. When arriving at the level of the chimneys 6, 6' of the dimplings 5, 5', the self-threading screws attack the inside of the chimney in which they are being screwed, finishing by tightening the two halves of the fastener. Once they have been screwed, the dimplings 5, 5', as well as the reverse side of the cups 41, 41' are embedded in the material of the end of the conveyor belt. The grip of the fastener thus does not come uniquely from the presence of the screw passing through the conveyor belt, but also from the grip from the reverse side of the cups 41, 41' and by the dimplings 5, 5'.

At this stage of the explanation, the flexibility claimed for the fixation of our new fastener has not yet been explained.

Figure 3:
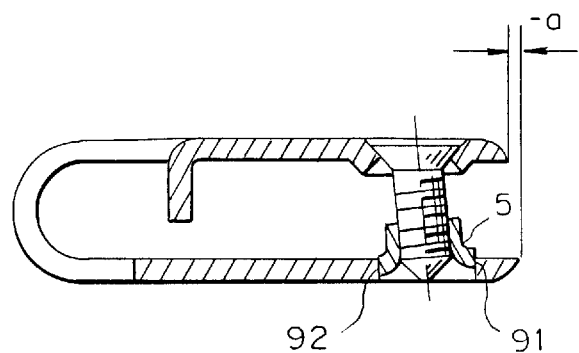
FIGS. 3 and 4 show the operational functions of the fastener according to the invention.
Figure 4:
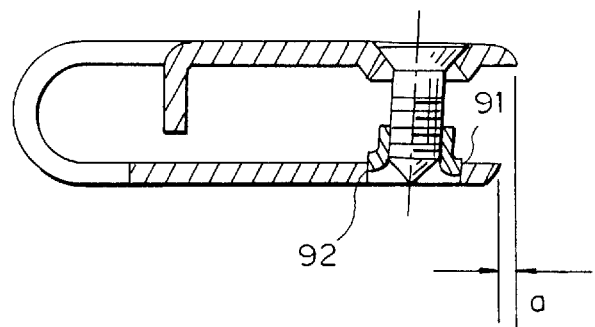

FIGS. 3 and 4 show the operational situations in which it is noted that the screws do not remain perpendicular to the upper and lower halves of the fastener.

Indeed, in FIG. 3, the screw is inclined in relation to the vertical; its head has slid into the cup, and the dimpling is also inclined towards the left.

In FIG. 4 the same inclination phenomenon, but this time towards the right, can be observed. This inclination, provoked by the strains of the passage of the conveyor belt on the forward or backward rollers, is the reflection of the difference of the path of the two halves of the fastener during passage over the rollers. This difference of path, which the fastener can adapt to, is shown by the gap a, or −a, which affects the ends of the fastener in the situations represented respectively in FIGS. 3 and 4.

This inclination of the dimpling 5 (and the dimpling 5' not shown) is made possible by the fact that, as already noted in FIG. 1, the dimpling does not constitute a continuous step 8 over the whole of its circumference. In fact, the step is suppressed in the circular sectors 81, 82, 81', 82', that is to say in the parts of the dimpling which, when the fastener is used, are arranged in the longitudinal direction of the conveyor belt (operational direction). In addition, shearings of the sheet metal are carried out, which appear in FIGS. 3 and 4, as 91 and 92. It is these which apart from the fact that they allow stamping of the step 8, also permit the tilting of the dimpling, which remains held by the intact parts of its step 8, that is to say that the intact parts work elastically by pivoting slightly, in one direction or the other, which allows the inclination of the dimpling, that of the screw, the sliding of the head of the screw into the cup, and the shift (a or −a) of the ends of the halves of the fastener, upper and lower.

This shift thus authorised makes it possible to absorb without excessive strain the differences of path of the upper and lower faces of the conveyor belt, the dimpling returning to a normal position when the strains have disappeared.

Thus, with the new fastener according to the invention, recourse to a fixation mode rigid by definition, that is screwing, is compensated by an advantageous flexibility obtained by the original shape of the dimplings.

What is claimed is:

1. Joining fastener for a conveyor belt, comprising two fixation plates (2 and 3) linked by hinge elements (1) in a U-shape, presenting in one of the fixation plates (2 or 3) linked by the U-shaped hinge elements (1), holes (4, 4') allowing the passage of a screw (7 or 7') and the gripping of its head and in the other fixation plate (3 or 2), dimplings (5, 5') which are oriented towards the first fixation plate (2 or 3), the screws (7, 7') passed into the holes of the first fixation plate (2 or 3) being able to be screwed in the dimplings which are arranged aligned with the holes (4, 4') corresponding to the first fixation plate (2 or 3) when the fastener is tightened on one end of the conveyor belt, characterised in that each of the dimplings present at their base steps (8, 8' and 8", 8''') extending around a part of their external circumference, but separated by two circular sectors (81, 82 and 81', 82') diametrically opposite, without any steps, generally oriented in the longitudinal direction of the conveyor belt on which the fastener according to the invention is set (or is to be set), the material of the fixation plate being sheared at the position of these non-deformed circular sectors in order to allow the formation of the step partially surrounding the dimpling, by stamping the fixation plate in which the dimplings are made.

2. Joining fastener for a conveyor belt according to claim 1, characterised in that the chimneys (6, 6') of the dimplings (5, 5') are threaded, their diameter, their pitch and their other characteristics corresponding to those of the screws (7, 7').

3. Joining fastener for a conveyor belt according to claim 1, characterised in that the holes (4, 4') comprise an aperture in the shape of a cup (41, 41').

* * * * *